(12) United States Patent  (10) Patent No.: US 7,715,189 B2
Iida et al.  (45) Date of Patent: May 11, 2010

(54) LAPTOP-TYPE PERSONAL COMPUTER (75) Inventors: Keiko Iida, Tokyo (JP); Katsuyoshi Onishi, Tokyo (JP)

(73) Assignee: Sony Corporation (JP)

( * ) Notice: Subject to any disclaimer, the term of this patent is extended or adjusted under 35 U.S.C. 154(b) by 331 days.

(21) Appl. No.: 11/583,269

(22) Filed: Oct. 19, 2006

(65) Prior Publication Data

US 2007/0121284 A1 May 31, 2007

(30) Foreign Application Priority Data

Oct. 21, 2005 (JP) ............................ P2005-306867

(51) Int. Cl.
*G06F 1/16* (2006.01)
*H05K 5/00* (2006.01)
*H05K 7/00* (2006.01)

(52) U.S. Cl. ............................ 361/679.55; 361/679.31; 379/433.09; 455/558

(58) Field of Classification Search ................ 361/683, 361/684, 679.02, 679.31, 679.37, 679.55; 379/433.09; 455/558
See application file for complete search history.

(56) References Cited

U.S. PATENT DOCUMENTS

| 5,699,406 | A * | 12/1997 | Liikanen et al. .............. 455/558 |
| 5,768,098 | A * | 6/1998 | Murayama ................... 361/684 |
| 6,115,243 | A * | 9/2000 | Horii .......................... 361/684 |
| 6,244,894 | B1 * | 6/2001 | Miyashita ................... 439/500 |
| 6,343,945 | B1 * | 2/2002 | Liikanen ...................... 361/814 |
| 6,535,750 | B1 * | 3/2003 | Van Gen ...................... 455/558 |
| 6,888,724 | B2 * | 5/2005 | Shaie .......................... 361/737 |
| 6,954,653 | B2 * | 10/2005 | Morita ........................ 455/558 |
| 7,095,437 | B1 * | 8/2006 | Hatakeyama ............. 348/231.7 |
| 7,280,846 | B2 * | 10/2007 | Lin ............................. 455/558 |
| 7,406,334 | B2 * | 7/2008 | Liu ............................. 455/558 |
| 2001/0017664 | A1 * | 8/2001 | Misawa ...................... 348/373 |
| 2002/0112112 | A1 * | 8/2002 | Yoshida ......................... 711/1 |
| 2002/0118826 | A1 * | 8/2002 | Kiernan et al. ......... 379/433.09 |
| 2002/0120857 | A1 * | 8/2002 | Krishnan et al. ............ 713/193 |
| 2003/0048605 | A1 * | 3/2003 | Kyozuka et al. ............ 361/683 |
| 2003/0069040 | A1 * | 4/2003 | Chuang et al. ............. 455/558 |
| 2003/0214780 | A1 * | 11/2003 | Oh-Yang et al. ............ 361/683 |
| 2004/0082210 | A1 * | 4/2004 | Wallace et al. ............. 439/152 |
| 2006/0098405 | A1 * | 5/2006 | Bloebaum ................... 361/685 |
| 2007/0275759 | A1 * | 11/2007 | Kemppinen ................. 455/558 |
| 2008/0194294 | A1 * | 8/2008 | Ryon .......................... 455/558 |

FOREIGN PATENT DOCUMENTS

JP 2003-319038 A 11/2003

* cited by examiner

*Primary Examiner*—Jayprakash N Gandhi
*Assistant Examiner*—Adrian S Wilson
(74) *Attorney, Agent, or Firm*—Lerner, David, Littenberg, Krumholz & Mentlik, LLP (57) ABSTRACT

A laptop-type personal computer operable on power supplied from at least one of an AC adaptor and a battery pack includes a memory card loader configured to detachably load a memory card powered by at least one of the AC adaptor and the battery pack; a cover mechanism configured to cover and uncover the memory card loader; a detector configured to detect whether the memory card loader is covered by the cover mechanism; and a controller configured to control the power supply to a memory card loaded on the memory card loader when the cover mechanism uncovers the memory card loader.

3 Claims, 7 Drawing Sheets

LAPTOP-TYPE PERSONAL COMPUTER

CROSS-REFERENCE TO RELATED APPLICATIONS

The present application claims priority from Japanese Patent Application No. JP 2005-306867 filed on Oct. 21, 2005, the disclosure of which is hereby incorporated by reference herein.

BACKGROUND OF THE INVENTION

1. Field of the Invention

The present invention relates to a laptop-type personal computer to which a memory card, such as a SIM (Subscriber Identity Module) card for example is connectible.

2. Description of the Related Art

Cellular phones have been using a scheme in which a memory card called a SIM card storing subscriber identification information is loaded in each cellular phone to enable cellular communication. Changing SIM cards allows each user to use different cellular phones. However, if this SIM card is loaded or unloaded on a particular cellular phone with the power turned on, the data stored in the SIM card may be destroyed. In order to prevent this trouble from happening, the SIM card loading/unloading slot is arranged such that the SIM card cannot be accessed unless the battery pack is removed, thereby guiding the user to load/unload the SIM card with the power to the cellular phone surely turned off.

For a patent document associated with a SIM-card based cellular phone refer to, for example Japanese Patent Laid-open No. 2003-319038.

Recently, a laptop-type personal computer has been proposed in which a SIM card, such as mentioned above, is loaded on the laptop-type personal computer to connect it to a WWAN (Wireless Wide Area Network) as with cellular phones.

Because the cellular phone is powered only by the battery pack, detaching this battery pack from the body of the cellular phone can surely turn off power of the cellular phone. However, the laptop-type personal computer is powered by both the battery pack and an AC adaptor, so that, if the laptop-type computer is powered also by the AC adaptor, the power to the SIM card cannot be turned off by detaching the battery pack when unloading the SIM card. Also, it would significantly detrimental to user-friendliness to power off the laptop-type personal computer only for the purpose of unloading the SIM card.

SUMMARY OF THE INVENTION

Therefore, the present invention addresses the above-identified and other problems associated with related-art methods and apparatuses and solves the addressed problems by providing a laptop-type personal computer configured such that, if the laptop-type personal computer is operating on the power supplied form an AC adaptor, a memory card loaded on the laptop-type personal computer can be unloaded safely without stopping this operation.

In carrying out the invention and according to one embodiment thereof, there is provided a laptop-type personal computer operable on power supplied from at least one of an AC adaptor and a battery pack. This laptop-type personal computer has a memory card loader configured to detachably load a memory card powered by at least one of the AC adaptor and the battery pack; a cover mechanism configured to cover and uncover the memory card loader; a detector configured to detect whether the memory card loader is covered by the cover mechanism; and a controller configured to control the power supply to a memory card loaded on the memory card loader when the cover mechanism uncovers the memory card loader.

According to the above-mentioned novel configuration, if the memory card loader is not covered by the cover mechanism, the power supply from the AC adaptor or the battery pack to the memory card can be stopped in a pinpoint manner if the laptop-type personal computer is powered by the AC adaptor or the battery pack. Consequently, the memory card loaded on the laptop-type personal computer can be safely unloaded while maintaining the operations of this computer.

The above-mentioned laptop-type personal computer may further have a battery pack loader configured to detachably load the battery pack, the battery pack loader being arranged to cover the memory card loader as the cover mechanism when the battery pack is loaded, wherein the detector detects whether the battery pack is loaded on the battery pack loader to detect whether the memory card loader is covered.

Consequently, the above-mentioned battery pack functions as a cover mechanism when the battery pack is loaded, so that, if the laptop-type personal computer is operating on power supplied from the battery pack, unloading the battery pack can surely turn off the power, thereby allowing the safe unloading of the memory card. If the laptop-type personal computer is operating on power supplied from the AC adaptor, unloading of the battery pack can stop the power supplied to the memory card by the above-mentioned controller, thereby allowing the safe unloading of the memory card.

In the above-mentioned laptop-type personal computer, the cover mechanism, arranged on the memory card loader, is openable and closable when the memory card is loaded and unloaded and the detector detects an open/closed position of the cover mechanism to detect whether the memory card loader is covered.

Consequently, the open/closed position of the cover mechanism is detected to stop the power supply to the memory card so that, if the laptop-type personal computer is powered by either the AC adaptor or the battery pack, the memory card can safely be unloaded while maintaining the operations of the computer and without unloading the battery pack.

In the above-mentioned laptop-type personal computer, the memory card may be a SIM card in which subscriber information associated with a subscriber to a wide area wireless communication network is stored, the laptop-type personal computer may further include a communicator configured to be connectible to the wide area wireless communication network with the SIM card loaded in the memory card loader, and the controller may stop the power supply to the SIM card by stopping the power supply to the communicator.

Consequently, if the laptop-type personal computer is operating on power supplied from either the AC adaptor or the battery pack, the SIM card can safely be unloaded without stopping the operations of the computer other than the connection to the above-mentioned wide area wireless communication network and without destroying data such as subscriber information stored in the above-mentioned SIM card.

As described and according to the embodiments of the present invention, each SIM card can safely be unloaded from a laptop-type computer if this computer is powered by either an AC adaptor or a battery pack, without stopping operations of the computer.

DETAILED DESCRIPTION

Now, embodiments of the present invention will be described in further detail with reference to the accompanying drawings.

First Embodiment

First, a first embodiment of the present invention will be described.

Figure 1:
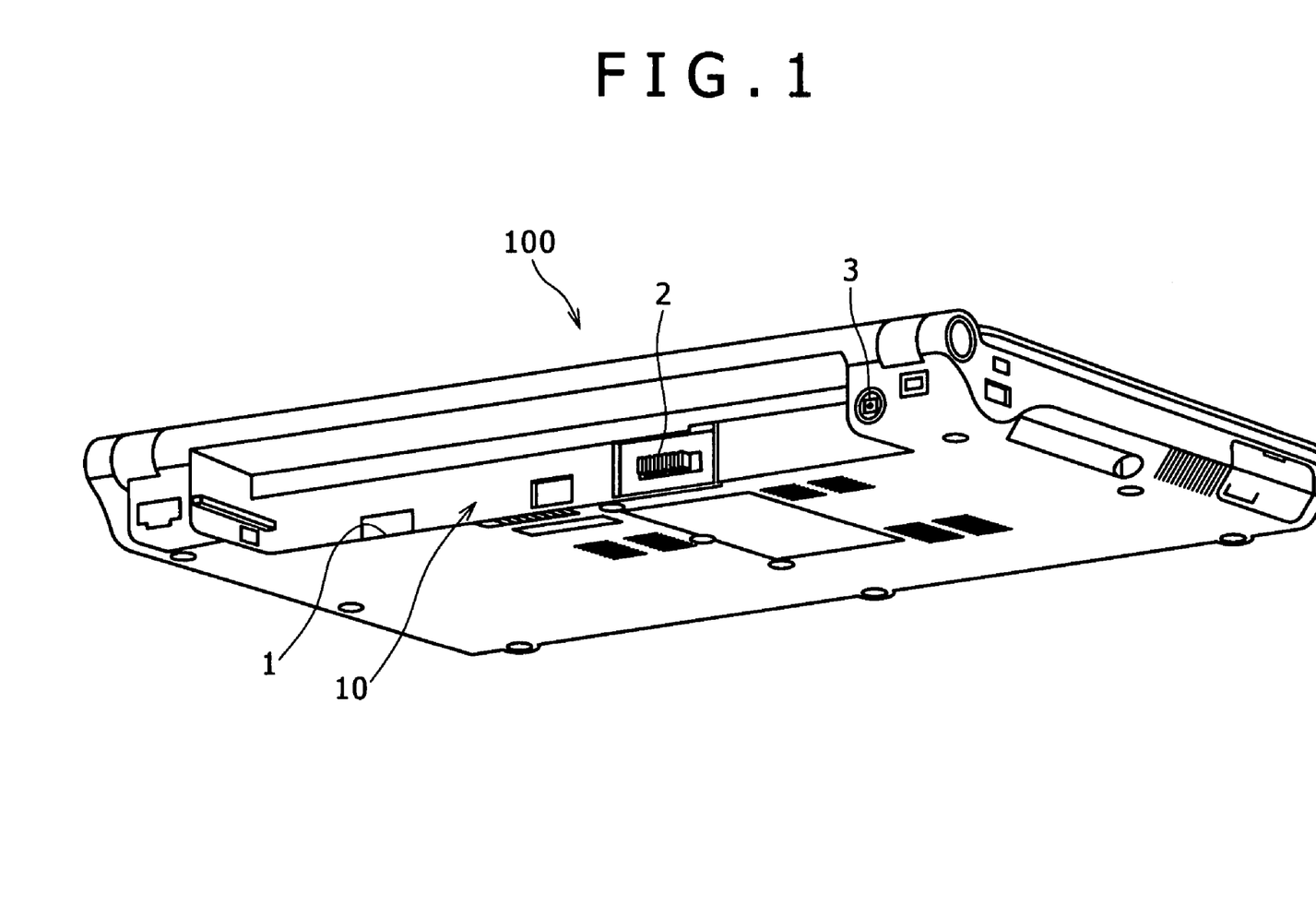
FIG. 1 is an external perspective view illustrating a laptop-type PC 100 practiced as a first embodiment of the present invention, as seen from the rear of the laptop-type PC 100.
Figure 2:
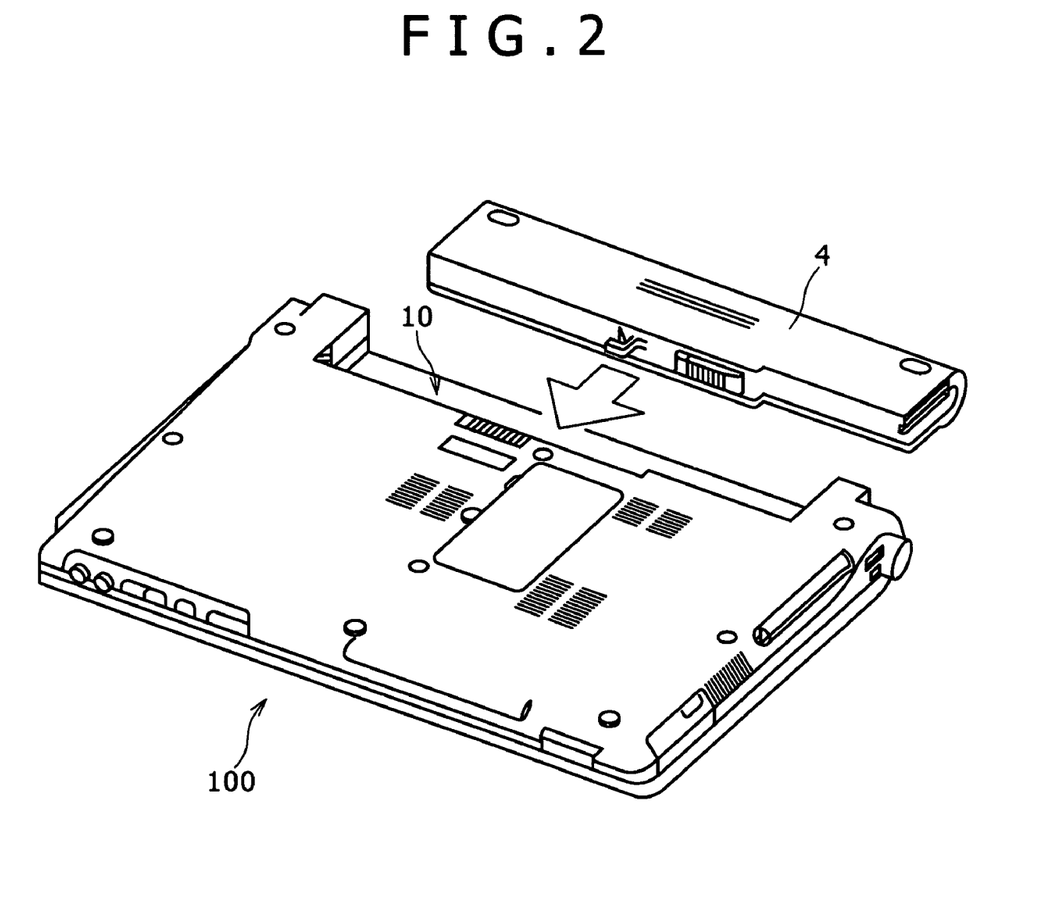
FIG. 2 is an external perspective view illustrating the above-mentioned laptop-type PC 100, as seen from the bottom of the laptop-type PC 100.

Referring to FIG. 1, there is shown an external perspective view of the rear side of a laptop-type PC (Personal Computer) 100 practiced as a first embodiment of the present invention. Referring to FIG. 2, there is shown an external view of the laptop-type PC 100 seen from the bottom thereof.

As shown in these figures, the laptop-type PC 100 is arranged on the rear side thereof with a battery pack loading block 10 on which a battery pack 4 can be loaded or unloaded. The battery pack 4 is inserted in the direction approximately parallel to the bottom face of the laptop-type PC 100 (namely, the direction indicated by the arrow shown in FIG. 2) to be loaded on the laptop-type PC 100. The battery pack loading block 10 has a connector 2. When the connector 2 is connected with a connector (not shown) of the battery pack 4, the battery pack 4 is electrically connected with the laptop-type PC 100.

The battery pack loading block 10 also has a SIM card loading block 1 on which a SIM card to be described later is loaded or unloaded. The SIM card loading block 1 is covered by the battery pack 4 when the battery pack 4 is loaded and exposed when the battery pack 4 is detached. Namely, the SIM card cannot be unloaded unless the battery pack 4 is detached from the laptop-type PC 100.

The laptop-type PC 100 is also arranged on the rear side thereof with an AC adaptor terminal 3 for connecting an AC adaptor. When an AC adaptor 5 is connected to the AC adaptor terminal 3, the AC power is supplied to the laptop-type PC 100.

Figure 3:
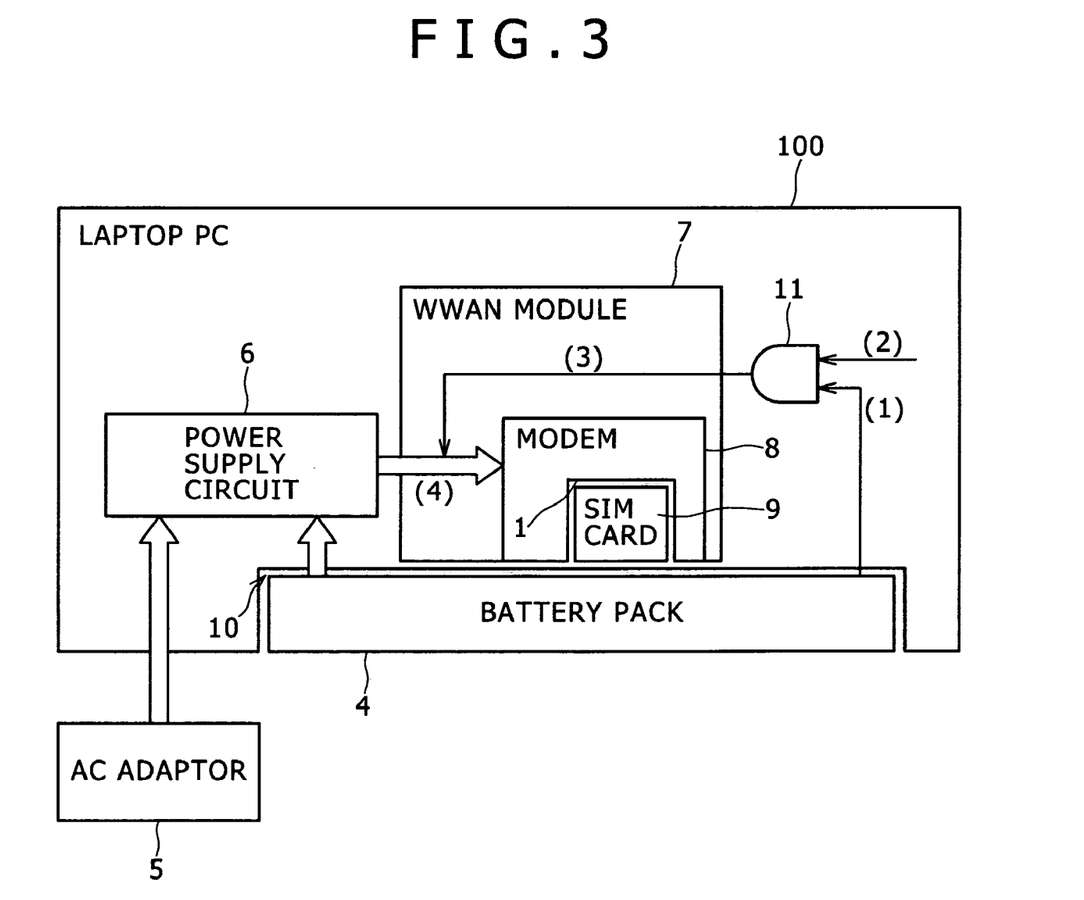
FIG. 3 is a block diagram illustrating an exemplary configuration of the above-mentioned laptop-type PC 100.

Referring to FIG. 3, there is shown a block diagram of an exemplary configuration of the laptop-type PC 100.

As shown in the figure, the laptop-type PC 100 has a WWAN module 7, a power supply circuit 6, an AND circuit 11, and so on. Although not shown, the laptop-type PC 100 also has a CPU (Central Processing Unit) for controlling the operation of the entire laptop-type PC 100, a RAM (Random Access Memory) for temporarily storing programs to be executed by the CPU and data to be used by the CPU for executing processing, a ROM (Read Only Memory) for fixedly storing programs to be executed by the CPU and various parameters as firmware, a HDD (Hard Disk Drive) for storing various kinds of data and programs as an external storage device, and other devices necessary for the laptop-type PC 100 to function as a personal computer.

The WWAN module 7 provides the connection to a WWAN (Wireless Wide Area Network) through a cellular phone line. The WWAN module 7 has a modem 8 for converting a digital signal generated by the laptop-type PC 100 into an audio signal to be transmitted over the above-mentioned cellular phone line and an audio signal received over the cellular phone line into digital data. The WWAN module 7 operates on the basis of a WWAN application stored in a HDD for example, not shown.

The SIM card 9 stores subscriber information for the identification of a subscriber of the above-mentioned WWAN (or the cellular phone line). Normally, the SIM card 9 is loaded on each cellular phone for use. As described above, the SIM card 9 is loadable and unloadable on the SIM card loading block 1, so that unlading the SIM card 9 from the cellular phone and loading the SIM card 9 on the SIM card loading block 1 allow the electrical connection between the WWAN module 7 (or the modem 8) and the SIM card 9, thereby making it ready for the executing of the connection capability of the laptop-type PC 100 to the WWAN. It should be noted that, in the first embodiment of the present invention, the SIM card loading block 1 is arranged at a position such that the SIM card 9 is unloadable unless the battery pack 4 is detached from the laptop-type PC 100 as described above.

The power supply circuit 6 gets power from the AC adaptor 5 via the AC adaptor terminal 3 or from the battery pack 4 if the AC adaptor 5 is not connected to the laptop-type PC 100 and supplies power to the WWAN module 7 and other component blocks. If the AC adaptor 5 is connected, the power supply circuit 6 also charges the battery pack 4.

As shown in arrow (1) in the figure, in the first embodiment of the present invention, the laptop-type PC 100 is always monitoring the loading or unloading of the battery pack 4; in accordance with the loading or unloading status (the status of connection or disconnection to the connector 2 shown in FIG. 1), an ON (logical High level) signal indicative of connection or an OFF (logical Low level) signal indicative of disconnection is applied to one of input terminals of the AND circuit 11.

As shown in arrow (2), the other input terminal of the AND circuit 11 is applied with a WWAN module power ON (logical High level) signal or OFF (logical Low level) signal that is outputted from the above-mentioned WWAN application to operate the WWAN module 7.

On the other hand, as shown in arrow (4), the power supply circuit 6 supplies the power from the AC adaptor 5 or the battery pack 4 to the modem 8 in the WWAN module 7 and also to the SIM card 9 via the modem 8.

Then, as shown in arrow (3), the output from the AND circuit 11 controls a power supply signal that is supplied from the power supply circuit 6 to the modem 8. Namely, if the signal indicative of the battery pack loaded/unloaded status shown in arrow (1) and the signal indicative of power ON/OFF of the WWAN module 7 shown in arrow (2) are both logical High level, or only if the battery pack 4 is loaded on the battery pack loading block 10 and the power signal to the WWAN module 7 is ON, then the power supply from the power supply circuit 6 to the modem 8 shown in arrow (4) is allowed; if one or both of the input signals to the AND circuit 11 are at logical Low level, this power supply is regulated (or stopped).

Figure 4:
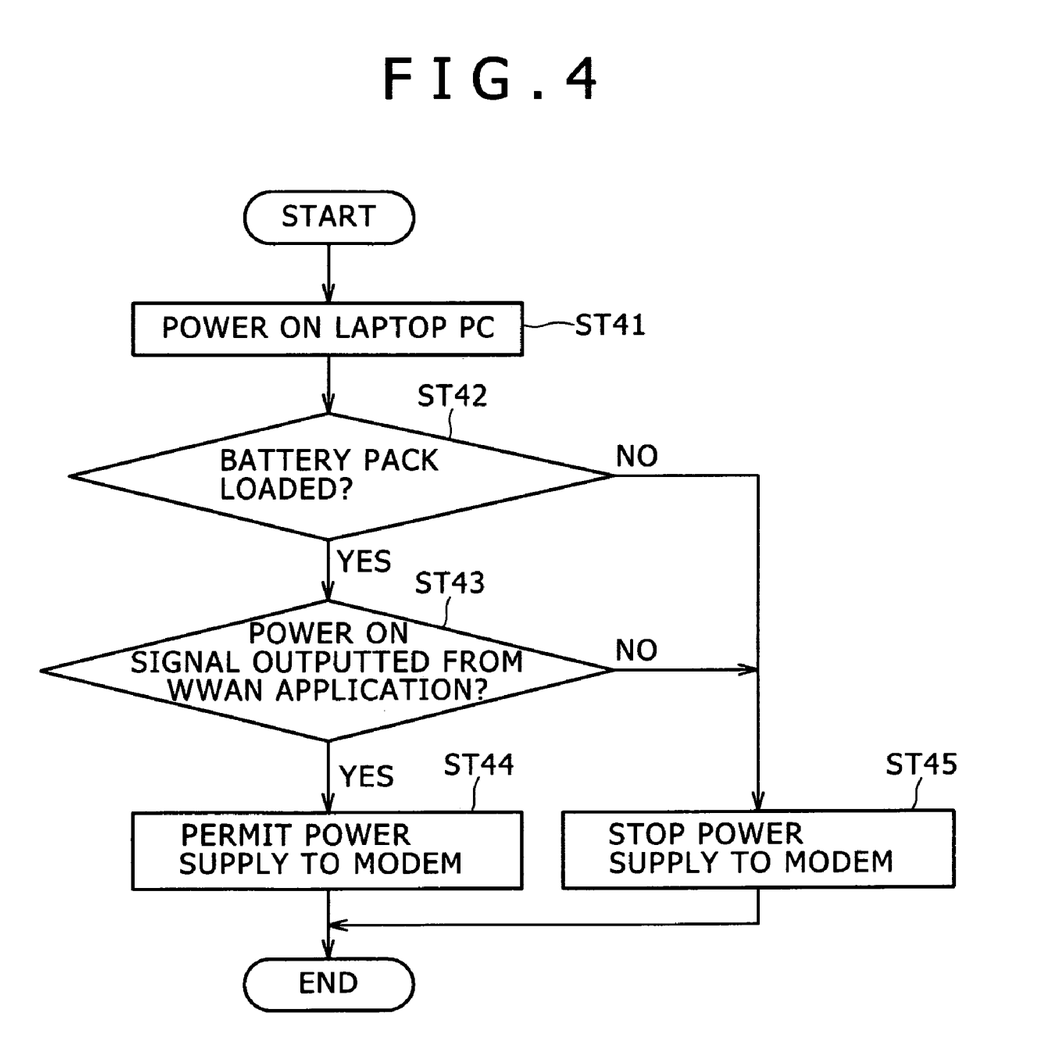
FIG. 4 is a flowchart indicative of an operational flow in controlling the power supply to a SIM card 9 in the above-mentioned laptop-type PC 100.

The following describes an operation that takes place when the power supply to the SIM card 9 is controlled in the laptop-type PC 100 with reference to FIGS. 3 and 4. FIG. 4 shows a flowchart indicative of the operation of the laptop-type PC 100 that takes place in this power supply control processing.

First, when the laptop-type PC 100 is powered on (step S41), the laptop-type PC 100 checks whether the battery pack 4 is loaded or not (step S42). To be more specific, the laptop-type PC 100 checks whether a switch, not shown arranged in the connector 2 of the battery pack loading block 10 is in the ON/OFF state. If the battery pack 4 is loaded (Yes in step 42), one of the input terminals of the AND circuit 11 shown in FIG. 3 is set to logical High level, while the AND circuit 11 is set to logical Low level if the battery pack 4 is not loaded.

On the other hand, the laptop-type PC 100 checks whether the power ON/OFF signal of the WWAN module 7 received from the WWAN application is applied to the other input terminal of the AND circuit 11 (step 43). If the power ON (logical High level) signal is applied with the battery pack 4 loaded (Yes in step 43), the AND circuit 11 is set to logical High level as a result of an AND operation between the signals applied to the input terminals of the AND circuit 11, thereby enabling the power supply to the modem 8 from the power supply circuit 6 (arrow (4) shown in FIG. 3), (step 44). To be more specific, the power is supplied to the 8 by turning ON a switch, not shown, arranged between the power supply circuit 6 and the modem 8 on the basis of the output of the AND circuit 11, for example.

If one of the input terminals of the AND circuit 11 is set to logical Low level with the battery pack 4 not loaded (No in step 42) or the other input terminal is applied with a WWAN module power OFF (logical Low level) signal from the WWAN application (No in step 43), then an AND operation output from the AND circuit 11 becomes logical Low level, thereby regulating (or stopping) the power supply from the power supply circuit 6 to the modem 8 (step 45). To be more specific, the power supply is stopped by turning off the switch between the power supply circuit 6 and the modem 8 on the basis of the above-mentioned logical Low signal.

In order to unload the SIM card 9 from the SIM card loading block 1 while the power is being supplied from the battery pack 4 to the laptop-type PC 100, the user has to always detach the battery pack 4 to expose the SIM card loading block 1, which necessarily powers off the laptop-type PC 100 and, obviously, the SIM card 9 via the modem 8.

On the other hand, if the power is being supplied from the AC adaptor 5 to the laptop-type PC 100, detaching the battery pack 4 by the user from the laptop-type PC 100 causes the AND operation output of the AND circuit 11 to go logical Low level if the power ON signal of the WWAN module 7 is inputted from the WWAN application into the AND circuit 11, thereby stopping the power supply from the power supply circuit 6 to the modem 8 to power off the SIM card 9.

As described above, if the user unloads the SIM card 9 from the SIM card loading block 1 while the laptop-type PC 100 is operating on the power supply from either the AC adaptor 5 or the battery pack 4, the power supply to the SIM card 9 is surely shut, thereby allowing the user to safely unload the SIM card. In addition, because the power supply from the AC adaptor 5 to the modem 8 is stopped in a pinpoint manner, the operations, other than the WWAN operation, of the laptop-type PC 100 supported by the power supply from AC adaptor 5 can be maintained as they are without restricting user convenience.

Second Embodiment

The following describes a second embodiment of the present invention.

It should be noted that, in the following description of the second embodiment of the present invention, components similar to those of the first embodiment previously described are denoted by the same reference numerals and the description of these similar components will be skipped or made briefly.

Figure 5:
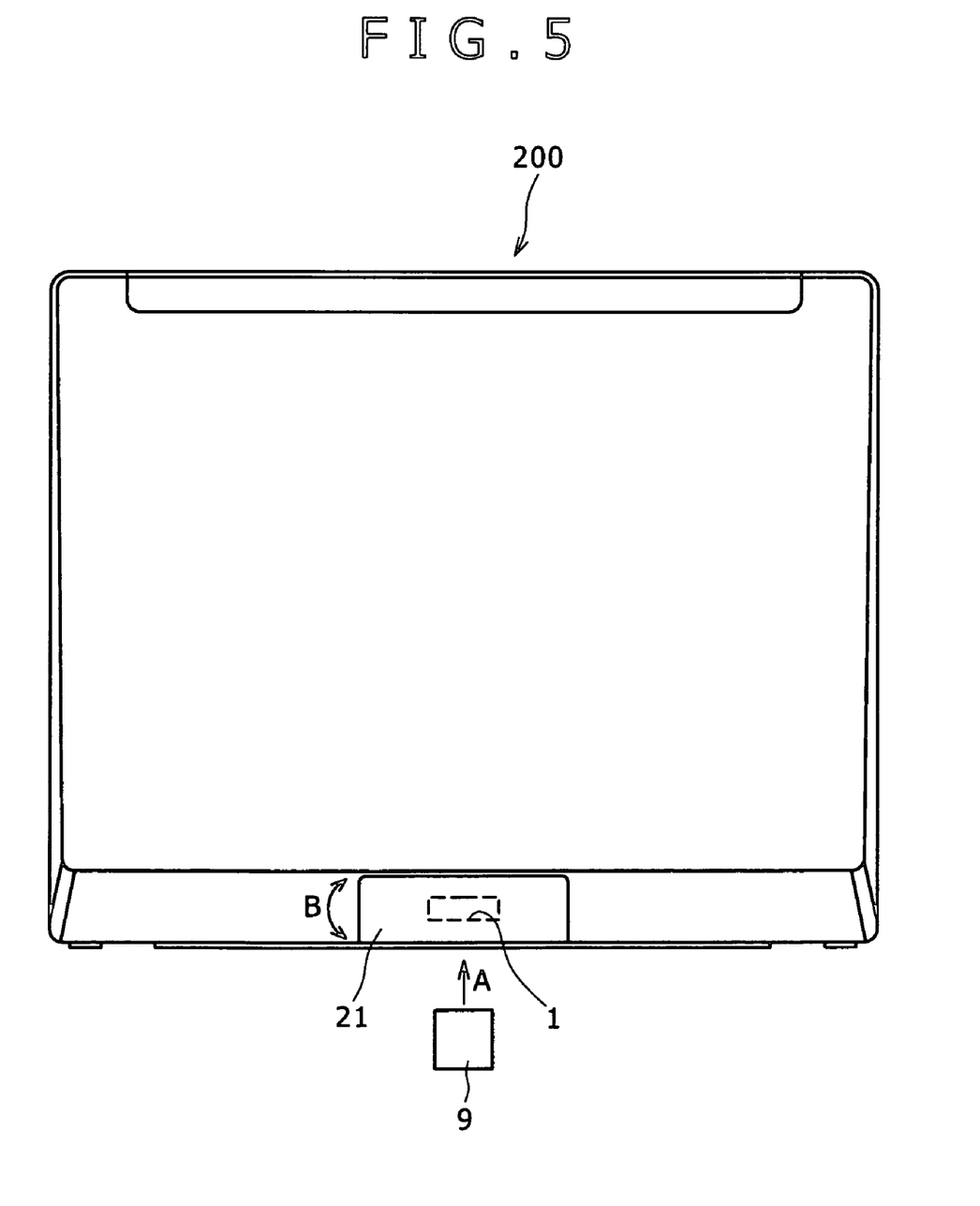
FIG. 5 is a top view illustrating an external view of a laptop-type PC 200 practiced as a second embodiment of the present invention.
Figure 6:
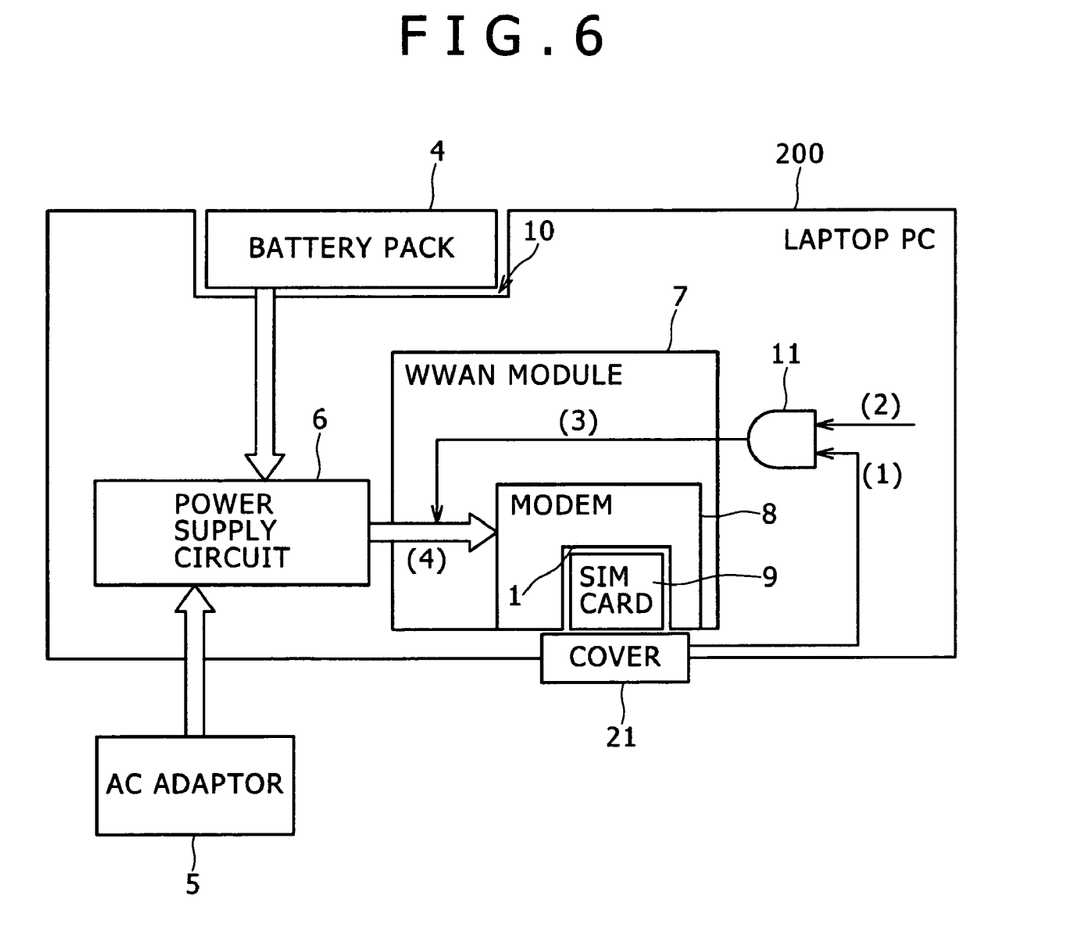
FIG. 6 is a block diagram illustrating an exemplary configuration of the above-mentioned laptop-type PC 200.

Referring to FIG. 5, there is shown an external top view of a laptop-type PC 200 practiced as the second embodiment of the present invention. Referring to FIG. 6, there is shown a block diagram illustrating an exemplary configuration of the laptop-type PC 200.

As shown in FIG. 5, a SIM card loading block 1 is arranged on top of the laptop-type PC 200 at approximately the center toward the operator, allowing a SIM card 9 to be loaded or unloaded in arrow direction A on the SIM card loading block 1. The SIM card loading block 1 is covered by a cover 21. The cover 21 is openable and reclosable arranged pivotally in arrow direction B shown in FIG. 5 around a shaft arranged parallel to the length of the laptop-type PC 200, for example. Opening the cover 21 exposes the SIM card loading block 1 to allow the loading or unloading of the SIM card.

As shown in arrow (1) of FIG. 6, the laptop-type PC 200 in the second embodiment always monitors the opening/closing of the cover 21, while, in the first embodiment, the laptop-type PC 100 always monitors a loading/unloading of the battery pack 4. To be more specific, when the cover 21 is closed, an AND circuit 11 is set to logical High level and, when the cover 21 is opened, the AND circuit 11 is set to logical Low level. The other configurations are substantially the same as those of the laptop-type PC 100 practiced as the first embodiment.

Figure 7:
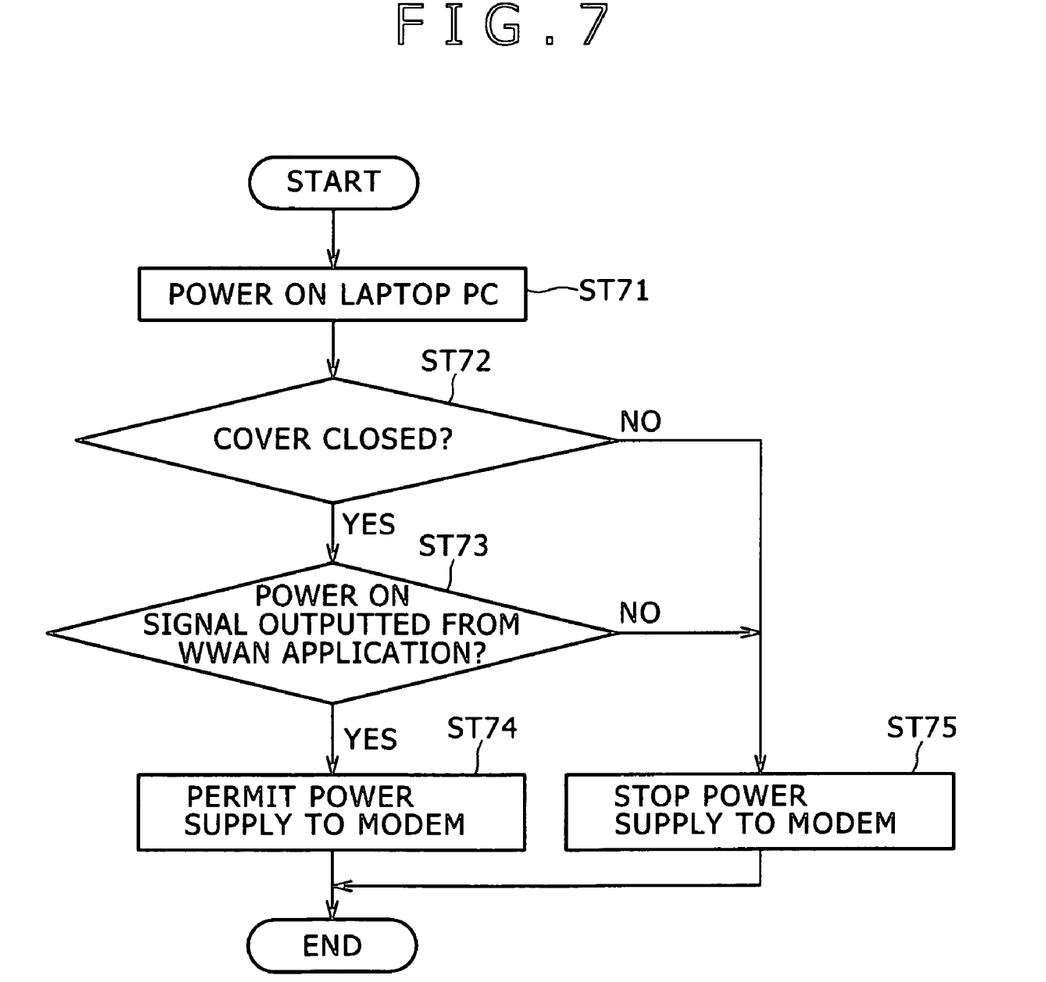
FIG. 7 is a flowchart indicative of an operational flow in controlling the power supply to the SIM card 9 in the above-mentioned laptop-type PC 200.

The following describes operations of the laptop-type PC 200 in the second embodiment with reference to FIGS. 6 and 7. FIG. 7 shows a flowchart indicative of a flow of operations to be executed when the laptop-type PC 200 controls the power supply to the SIM card 9.

First, when the laptop-type PC 200 is powered on (step 71), the laptop-type PC 200 checks whether the cover 21 is open or closed (step 72). To be more specific, the open/close of the cover 21 is determined by a sensor (or a switch), not shown, arranged on an open/close shaft of the cover 21; as described above, if the cover 21 is closed, one of input terminals of an AND circuit 11 is set to logical High level and, if the cover 21 is open, this input terminal is set to logical Low level.

The other input terminal of the AND circuit 11 is applied with a power ON/OFF signal of a WWAN module 7 from a WWAN application as with the above-mentioned first embodiment (FIG. 3). Subsequently, in accordance with the open/close status of the cover 21, the power supply from a power supply circuit 6 to a modem 8 is controlled on the basis of an AND operation output of the AND circuit 11 as with the above-mentioned first embodiment (FIG. 4), thereby controlling the power supply to the SIM card 9 (steps 73 through 75).

As described above, because the power supply to the modem 8 is controlled in accordance with the open/close status of the cover 21, the power supply to the SIM card 9 can be surely stopped without unloading the battery pack 4 while the laptop-type PC 200 is operating on the power supply from either an AC adaptor 5 or the battery pack 4, thereby allowing the SIM card 9 to be safely unloaded. In addition, the operations of the laptop-type PC 200 other than a WWAN operation can be maintained as with the first embodiment. Further, because the SIM card 9 can be safely unloaded by opening the cover 21, the power supply to the SIM card 9 can be stopped without making the user be aware of an operation of turning the power off, thereby enhancing user convenience.

While preferred embodiments of the present invention have been described using specific terms, such description is for illustrative purpose only, and it is to be understood that changes and variations may be made without departing from the spirit or scope of the following claims.

Each of the above-mentioned two embodiments has been described by use of the SIM card 9 as a memory card for example. It will be apparent to those skilled in the art that memory cards of any other types are applicable as far as they demand the power shut-off before their loading or unloading.

It will also be apparent to those skilled in the art that the capabilities to be executed by the above-mentioned memory card and the applications and modules necessary for the execution are not restricted to the WWAN in the above-mentioned embodiments.

It will be apparent to those skilled in the art that the configurations of the laptop-type PC 100 and the laptop-type PC 200 are not restricted to those described above. The PCs of any other configurations are applicable as far as the AC adaptor 5 and the battery pack 4 are arranged.

It should be understood by those skilled in the art that various modifications, combinations, sub-combinations and alterations may occur depending on design requirements and other factors insofar as they are within the scope of the appended claims or the equivalents thereof.

The invention claimed is:

1. A laptop-type personal computer operable on power supplied from one or both of an AC adaptor and a battery pack, comprising:
    a SIM card loader configured to detachably load a SIM card to a wide area wireless communication network, in which the SIM card has subscriber information associated with a subscriber stored therein;
    a communicator configured to be connectible to the wide area wireless communication network with the SIM card loaded in the SIM card loader, said communicator being electrically connected to the SIM card when the SIM card is loaded in the SIM card loader;
    a cover mechanism configured to cover and uncover the SIM card loader;
    a detector configured to detect whether the SIM card loader is covered by the cover mechanism;
    a power supply circuit configured to obtain power from the one or both of the AC adaptor and the battery pack, and to supply power to said communicator and to the SIM card by way of said communicator; and
    a controller configured to control whether or not power is supplied to the SIM card loaded on the SIM card loader such that (i) power is supplied to the SIM card loaded on the SIM card loader when the cover mechanism covers the SIM card loader and when the AC adaptor or the battery pack supplies power to the personal computer and (ii) power is not supplied to the SIM card loaded on the SIM card loader when the cover mechanism uncovers the SIM card loader even while the AC adaptor supplies power to the personal computer,
    wherein the controller is configured to stop the power from being supplied to the SIM card by stopping the power supplied to said communicator.

2. The laptop-type personal computer according to claim 1, further comprising:
    a battery pack loader configured to detachably load the battery pack, said battery pack loader being arranged to cover the SIM card loader as the cover mechanism when the battery pack is loaded, wherein
    the detector detects whether the battery pack is loaded on the battery pack loader to detect whether the SIM card loader is covered.

3. The laptop-type personal computer according to claim 1, wherein
    the cover mechanism, arranged on the STM card loader, is openable and closable when the SIM card is loaded and unloaded, and
    the detector detects an open/closed position of the cover mechanism to detect whether the SIM card loader is covered.

* * * * *